US012340086B2

United States Patent
Blinzer et al.

(10) Patent No.: US 12,340,086 B2
(45) Date of Patent: Jun. 24, 2025

(54) APPARATUS AND METHODS FOR DIRECT CO-PROCESSOR ACCESS TO PRESTORED FILE SYSTEM DATA IN A NON-VOLATILE MEMORY SYSTEM

(71) Applicant: ADVANCED MICRO DEVICES, INC., Santa Clara, CA (US)

(72) Inventors: Paul Blinzer, Bellevue, WA (US); David Livingstain Ziman, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 202 days.

(21) Appl. No.: 18/148,091

(22) Filed: Dec. 29, 2022

(65) Prior Publication Data

US 2024/0220115 A1    Jul. 4, 2024

(51) Int. Cl.
  *G06F 3/06*     (2006.01)
  *G06F 12/0862*  (2016.01)
  *G06T 1/20*     (2006.01)
  *G06T 11/00*    (2006.01)

(52) U.S. Cl.
  CPC .......... *G06F 3/0611* (2013.01); *G06F 3/0656* (2013.01); *G06F 3/0659* (2013.01); *G06F 3/0679* (2013.01); *G06F 12/0862* (2013.01); *G06T 1/20* (2013.01); *G06T 11/001* (2013.01); *G06F 2212/1024* (2013.01); *G06F 2212/602* (2013.01); *G06T 2210/36* (2013.01)

(58) Field of Classification Search
  CPC .... G06F 3/0611; G06F 3/0656; G06F 3/0659; G06F 3/0679; G06F 12/0862; G06F 2212/1024; G06F 2212/602; G06T 1/20; G06T 11/001; G06T 2210/36
  USPC ........................................... 711/103
  See application file for complete search history.

(56) References Cited

U.S. PATENT DOCUMENTS 7,010,626 B2 *  3/2006  Kahle ............... G06F 13/28
                                              710/33
7,015,915 B1 *  3/2006  Diard ............. G06F 15/8007
                                              345/522

(Continued)

OTHER PUBLICATIONS

Microsoft, File systems driver design guide, URL: https://learn.microsoft.com/en-us/windows-hardware/drivers/ifs/, dated Mar. 9, 2022, 2 pages.

(Continued)

*Primary Examiner* — Christopher B Shin

(57) ABSTRACT

An apparatus includes a co-processor that provides process operations for a first processor, such as a host processor, that executes one or more applications. The co-processor issues a data load request to a request command queue controlled by a non-volatile memory system, that loads a subset of prestored data from a prestored set of data, such as file data of an application, that is stored in a cache buffer in the non-volatile memory system or system memory, for an operation performed by the co-processor. The co-processor uses the loaded subset of prestored data for the operation. In certain implementations, the co-processor issues the data load request as a direct memory access (DMA) load request for the cache buffer. The prestored set of data includes a prestored set of data from a file storage system. Associated methods are also disclosed.

20 Claims, 4 Drawing Sheets

(56) References Cited

U.S. PATENT DOCUMENTS

| | | | |
|---|---|---|---|
| 2004/0263521 A1* | 12/2004 | Booth, Jr. | G06F 9/3879 |
| | | | 345/503 |
| 2005/0041031 A1* | 2/2005 | Diard | G09G 5/393 |
| | | | 345/505 |
| 2007/0211070 A1* | 9/2007 | Stenson | G06T 15/04 |
| | | | 345/587 |
| 2011/0210976 A1* | 9/2011 | Diard | G06F 9/455 |
| | | | 345/522 |
| 2017/0147516 A1* | 5/2017 | De | G06F 3/0685 |
| 2018/0012328 A1* | 1/2018 | Boles | G06T 1/60 |
| 2020/0193697 A1* | 6/2020 | Brennan | G06T 15/80 |
| 2021/0117333 A1* | 4/2021 | Qureshi | G06F 3/0658 |
| 2021/0191771 A1* | 6/2021 | Mccrary | G06F 9/542 |
| 2021/0406209 A1* | 12/2021 | Vishnu | G06F 13/28 |
| 2022/0413732 A1* | 12/2022 | Blinzer | G06N 20/00 |

OTHER PUBLICATIONS

Microsoft, IoGetIommuInterface function (wdm.h), URL: https://learn.microsoft.com/en-us/windows-hardware/drivers/ddi/wdm/nf-wdm-iogetiommuinterface, dated Feb. 25, 2022. 2 pages.

Microsoft, Windows-driver samples / filesys /, URL: https://github.com/microsoft/Windows-driver-samples/tree/main/filesys, dated May 18, 2022, retrieved Oct. 4, 2022, 1 page.

\* cited by examiner

APPARATUS AND METHODS FOR DIRECT CO-PROCESSOR ACCESS TO PRESTORED FILE SYSTEM DATA IN A NON-VOLATILE MEMORY SYSTEM

BACKGROUND OF THE DISCLOSURE

Computing systems such as gaming systems, cloud gaming systems, cloud servers, machine learning systems or other computing systems employ host processors, such as processors executing instances of a Hypervisor, operating systems (OS) and/or applications and co-processors that accelerate operations for the host processor. Examples of co-processors include integrated graphics processors (also referred to as graphics processing units (GPUs), discrete graphics processors, machine learning processors, artificial intelligence processors and other types of co-processors.

Also, co-processors in some configurations are a type of input output (I/O) device that connects to the host processor along with other peripheral devices through an expansion bus such as a peripheral component interconnect bus. Examples of peripheral devices include non-volatile memory (e.g., NVMe type) storage systems, also referred to as persistent mass storage systems, including hard disk drives (HDDs) and solid state drives (SSDs), smart data acceleration interface (SDXI) engines, universal serial bus (USB) devices, network interface cards and other peripheral clients. Some of the peripheral devices are also configured to operate as physical functions (PF) and virtual functions (VF) as part of virtual machine (VM) operation.

Gaming, content creation and machine learning applications executing on the host processor are requiring larger and larger amounts of data processing by the co-processors to generate more life-like gaming scenes, avatars, enhanced video conferencing functions, machine learning operations and other data intensive operations.

BRIEF DESCRIPTION OF THE DRAWINGS

The implementations will be more readily understood in view of the following description when accompanied by the below figures, wherein like reference numerals represent like elements, and wherein.

Figure 2:
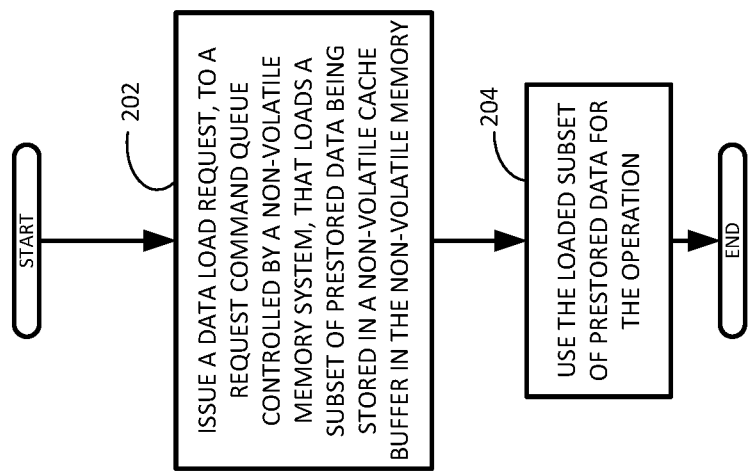
FIG. 2 is a flowchart illustrating a method for direct co-processor access to prestored file system data in a non-volatile memory system in accordance with an example set forth in the disclosure.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

Existing computing systems that provide graphics scene generation require extensive application and therefore host central processing unit (CPU) involvement to process Level Of Detail (LOD) information determined by the GPU in generating image objects and scenes. Typically the LOD information is sent by the GPU to the application with a complicated transfer process involving the GPU sending off an interrupt, a GPU driver querying the information from GPU memory, copying the information into CPU view and then the driver issuing an operating system (OS) event to wake up an application thread evaluating the LOD value, determining the appropriate texture tile information for the LOD value and from there issue a system file I/O read to the non-volatile memory storage system (crossing several layers of software from disk management, file system to an NVMe driver) to retrieve the texture from the file data, copy the texture data into a GPU accessible buffer and then issue a GPU transfer to read the texture data into GPU memory to then use the updated texture data to render the next frame. This is a long, drawn out procedure.

In some implementations described herein a more efficient GPU optimized data flow is used that is more efficient and includes latency benefits. By way of example, for a gaming application or content creation application, on demand texture loads by GPUs with an NVMe system (flash drives/SSD/HD). A request command queue and cache buffer is put in the NVMe system and made accessible by (integrated or discrete) GPUs to load requests/textures directly from the NVMe system. This provides a type of GPU pull operation for preloaded file data in the NVMe system that was preloaded by an application. The request (CMD) queue is located in a system memory buffer or in the NVMe system itself and there is no host CPU involvement for a load request of file system data from the application. Instead, the GPU employs direct NVMe system access by the GPU so the request for data comes directly from the GPU for a job. In some implementations, the host CPU still prepares request parameters and preloads file data in the cache buffer but the load request for data is processed by the NVMe system and file system data is accessed directly by GPU. For example, as to GPUs and shaders that execute on the GPUs, the disclosed approach short cuts many communication messages in the prior art and allows the GPU shader that has determined the level of detail (LOD) for a scene or operation to directly communicate with appropriate NVMe storage driver stack components, drastically reducing the overhead and therefore drastically reducing the latency for the GPU to react to changes in scene rendering due to LOD updates.

In some implementations, the NVMe driver receives a preload request to load a possible mipmap texture range into a designated buffer range in the NVMe system from a file in the file system in the NVMe storage system, and when the GPU determines LOD level, the GPU uses direct memory accesses from the cache buffer into GPU memory to render an appropriate MIP texture level from the original mipmap texture tile pulled from the NVMe buffer. The approach drastically reduces latencies as the load request does not have to be passed through kernel and user mode levels in a driver and application and improves power and performance as the host CPU can be either idled or used for other purposes. In some implementations, the GPU (or kernel driver) directly issues a preload request to the NVMe storage stack.

In some implementations, an apparatus comprises a co-processor that provides process operations for a first processor, such as a host central processing unit (CPU), that executes one or more applications. The co-processor issues a data load request, to a request command queue, controlled by a non-volatile memory system, that loads a subset of prestored data from a prestored set of data, such as file system data, being stored in a cache buffer, for an operation performed by the co-processor. In some implementations the cache buffer is addressable in the non-volatile memory system. In certain implementations the cache buffer is addressable in system memory. The co-processor uses the loaded subset of prestored data for the operation.

In some implementations, the co-processor issues the data load request as a direct memory access (DMA) load request for the cache buffer. The operation is carried out for an application and the prestored set of data comprises a prestored set of data from a file system associated with the application.

In certain implementations, the co-processor periodically predicts future subsets of data needed from the prestored set of data in the cache buffer for the operation and periodically issues a DMA load request to the request command queue controlled by the non-volatile memory system, corresponding to each of the predicted subsets of data from the prestored set of data.

In some implementations, the co-processor uses an address block translation table to translate a determined level of detail (LOD) to at least one texture prestored in the prestored set of data, and wherein the data load request includes translated block address information corresponding to the subset of prestored data in the prestored set of data that corresponds to the determined LOD.

In certain implementations, the co-processor comprises a graphics processing unit (GPU) and the prestored set of data being stored in the cache buffer comprises a range of mipmap data. The GPU identifies a future level of detail (LOD) needed to render an object of an image and issues the DMA load request identifying a block of addresses corresponding to the identified future LOD as the subset of prestored data; and performs a pixel rendering operation using loaded subset of prestored data from the DMA load request.

In some implementations, the co-processor issues the DMA load request by issuing a load request for the non-volatile memory (NVMe) system based on an address block translation table.

In certain implementations, a computer processing system comprises a processor that executes one or more applications, a non-volatile memory system comprising a request command queue and a cache buffer and a co-processor that provides operations for the processor. In some implementations, the co-processor issue a data load request to the request command queue controlled by the non-volatile memory system, that loads a subset of prestored data from a prestored set of data being stored in the cache buffer in the non-volatile memory system, for an operation performed by the co-processor. In certain implementations, the co-processor uses the loaded subset of prestored data for the operation.

In some implementations, the processor configures system memory to include the request command queue and configures the non-volatile memory system to include the cache buffer. The processor, such as through an executing application and/or driver, determines an amount of data from a file system to store as the prestored set of data. In certain implementations, the processor preloads the cache buffer with a prestored set of data from a file system associated with an application.

In some implementations, the co-processor issues the data load request as a direct memory access (DMA) load request for the cache buffer and the operation is carried out for an application. In certain implementations, the prestored set of data comprises a prestored set of data of mipmaps from a file system associated with the application.

In some implementations, the co-processor periodically predicts future subsets of data needed from the prestored set of data in the cache buffer; and periodically issues data load requests to the request command queue, corresponding to each of the predicted subsets of data.

In certain implementations, the co-processor of the computer processing system uses an address block translation table to translate a determined level of detail (LOD) to at least one texture prestored in the prestored set of data, and wherein the data load request includes translated block address information corresponding to the subset of prestored data in the prestored set of data that corresponds to the determined LOD.

In some implementations, the co-processor of the computer processing system periodically issues the data load requests that each includes block address information corresponding to each of the subsets of data in the prestored set of data.

In certain implementations, computer processing system comprises a graphics processing unit (GPU) and wherein the prestored set of data being stored in the cache buffer comprises a range of mipmap data and the GPU identifies a future level of detail (LOD) needed to render an object of an image and issue the DMA load request identifying a block of addresses corresponding to a subset of mipmap data for the future LOD; and performs a pixel rendering operation using loaded subset of prestored data from the DMA load request using the subset of mipmap data.

In some implementations, the computer processing system employs a co-processor that issues the DMA load request by issuing a load request for the non-volatile memory system.

In certain implementations, a method carried out by a co-processor performs operations for the first processor. In some implementations the method comprises issuing a data load request to a request command queue controlled by a non-volatile memory system, that loads a subset of prestored data from a prestored set of data being stored in a cache buffer, for an operation performed by the co-processor; and using the loaded subset of prestored data for the operation.

In some implementations, the method includes periodically predicting future subsets of data needed from the prestored set of data in the cache buffer for the operation; and periodically issuing data load requests to the request command queue controlled by the non-volatile memory system, corresponding to each of the predicted subsets of data.

In certain implementations, the method includes issuing the data load request as a direct memory access (DMA) load request for the cache buffer by issuing a load request for the non-volatile memory system. The operation is carried out for an application. In some implementations, the prestored set of data comprises a prestored set of data from a file system associated with the application.

In certain implementations, the method comprises using an address block translation table to translate a determined level of detail (LOD) to at least one texture prestored as the prestored set of data. The data load request includes translated block address information corresponding to the subset of prestored data in the prestored set of data that corresponds to the determined LOD.

In some implementations, the method comprises identifying a future level of detail (LOD) needed to render an object of an image and issues the DMA load request identifying a block of addresses corresponding to the identified future LOD as the subset of prestored data; and performing a pixel rendering operation using loaded subset of prestored data from the DMA load request.

Figure 1:
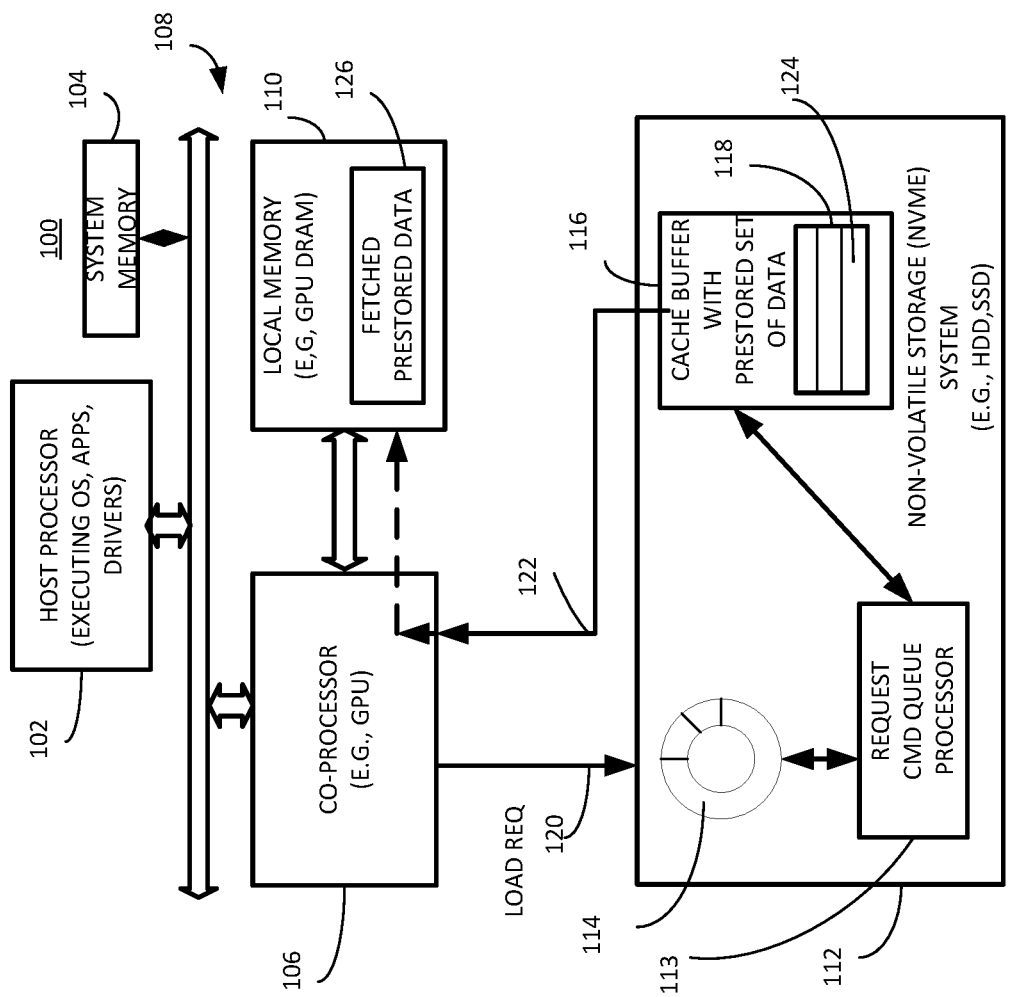
FIG. 1 illustrates a block diagram of computer processing system that provides for direct co-processor access to pre-stored file system data in a non-volatile memory system in accordance with an example set forth in the disclosure.

FIG. 1 is a block diagram illustrating one embodiment of a computer processing system 100, such as a system on chip, data center server, laptop, mobile phone, internet appliance, gaming cloud server, gaming console, machine learning device, artificial intelligence device or other suitable device. A first processor, such as a host processor 102, is configured to execute instructions stored in system memory 104 and in some examples the host processor 102 includes a central processing unit (CPU), an accelerated processing unit (APU), machine learning unit, artificial intelligence unit or other suitable processing devices. The host processor includes, in some examples, a plurality of processing cores. One or more co-processors 106, such as I/O a peripheral device or processor integrated on the same die as the host processor, provides process operations for the host processor, such as for an application executing on the host processor.

The computer processing system 100 will be described as a cloud server system, for illustration purposes only, and it will be recognized that any suitable configuration may be employed. In this example, the host processor 102 includes a multi-core central processing unit, and if desired includes a multi-core GPU, multi-core APU or any suitable processor. In this example, communication arrow 108 represents known interconnections and interface structures including data fabrics. For example, a peripheral component interconnect interface, such as a PCIe compliant interface as known in the art that supports multiple I/O devices which includes multiple device functions and uses the configuration space for all devices and functions. Each peripheral device can include multiple root ports and can include multiple physical functions (PF) and virtual functions (VF); however, any suitable peripheral devices can be used. In some implementations the co-processor is an I/O device. In other implementations the co-processor is not treated as an I/O device.

In some examples, the co-processor 106 is one or more discrete graphics processing units, integrated graphics processing units, machine learning units, artificial intelligence units, or other devices including identified virtual machines of the devices, identified functions (virtual and/or physical functions) of devices that are connected to the host processor through the peripheral component interconnect interface.

The host processor 102 in this example executes one or more of an operating system OS, a hypervisor, one or more applications, drivers, including multiple instances thereof if desired. The co-processor 106, such as an integrated or discrete GPU, is operatively coupled to the host processor, and uses local memory 110, such as DRAM or any other suitable memory to store data that is required by or resulting from operations carried out by the co-processor 106 for the host processor 102. A non-volatile memory system 112, operatively coupled to the host processor and operatively coupled to the co-processor, serves as a backend storage file system, and includes one or more of a hard disk drive (HDD) system, an SSD system, or any other suitable mass non-volatile memory complex that stores applications and associated file system data, drivers for the co-processor and other software that is loaded into system memory 104 for execution by the host processor. In this example the non-volatile memory system 112 includes a request command queue processor 113 that controls a request command queue 114 and also includes a cache buffer 116. In this example, the request command queue 114 is a ring buffer structure that resides in system memory. In some implementations, the cache buffer 116 is located in system memory.

Referring also to FIG. 2, a method for directly obtaining file system data by a co-processor is shown and will be described with reference to FIG. 1. It will be recognized however that any suitable structure may be used. It will also be recognized that the operations for the processes described herein may be performed in any suitable order. It is shown in black 200, the method begins after initialization of the load request command queue 114 and cache buffer 116 in the non-volatile memory system 112. As part of the initialization process, the cache buffer 116 is preloaded with a set of data referred to as a subset of prestored data 118 that in some implementations is prestored from a file system associated with an application executing on the host processor 102 that is using the co-processor 106 to carry out operations for the application. As shown in block 202 the method includes the co-processor 106 issuing a data load request 120, such as a DMA load request, to the request command queue 114 that is controlled by the non-volatile memory system 112. The request command queue 114 includes entries to store data load requests from the co-processor 106. The data load request 120 loads a subset of prestored data 124, shown as the requested subset of data 122, of the subset of prestored data 118 being stored in the cache buffer 116 in the non-volatile memory system 112 for an operation performed by the co-processor 106. In this example the data load request 120 is a direct memory access request to the cache buffer 116 that loads retrieved data into local memory 110 of the co-processor. It will be recognized that an operation may be any operation carried out by the co-processor 106 that uses the subset of prestored data 118 in the cache buffer 116. As shown by block 204, the method includes using the loaded subset of prestored data 126 in the operation.

Figure 3:
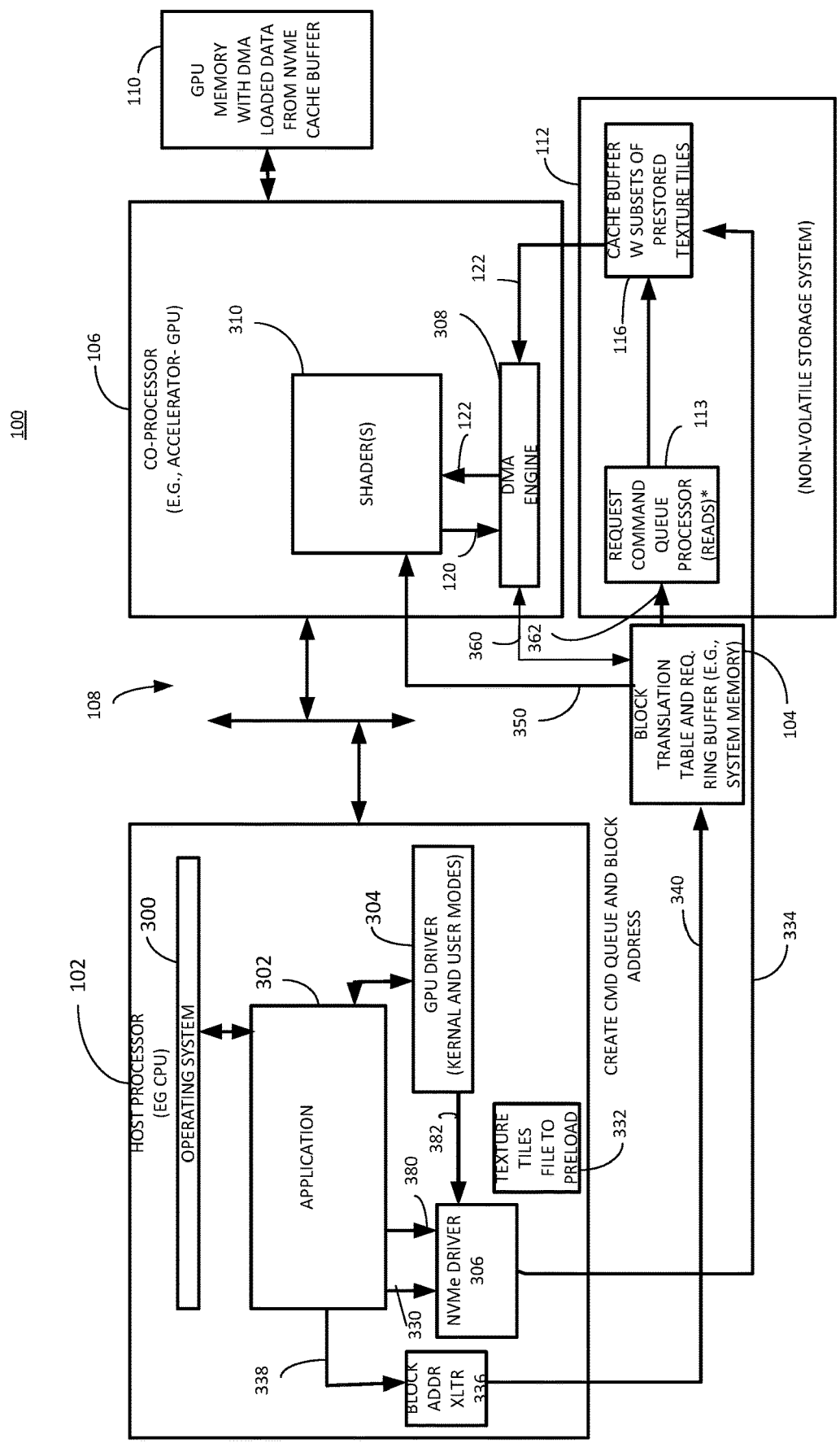
FIG. 3 illustrates a block diagram of a computer processing system that provides for direct co-processor access to prestored file system data in a non-volatile memory system in accordance with an example set forth in the disclosure.

Referring to FIG. 3, another example of the computer processing system 100 wherein the co-processor 106 is a graphics processing unit, local memory 110 includes GPU memory including one or more frame buffers and the host processor is implemented as a central processing unit (CPU) that executes an operating system 300, an application 302, a GPU driver 304, and a nonvolatile memory (NVMe) driver 306. In this example the co-processor 106 includes one or more shaders 310 that carry out scene and pixel rendering operations to produce image frames that are output to display device. A direct memory access engine 308 is used by the shader 310, in this example, to obtain prestored texture tiles that are a range of mipmap data, that are stored as the subset of prestored data 118 in the cache buffer 116. Mipmaps or pyramids are pre-calculated, optimized sequences of images, such as texture tiles, each of which is a progressively lower resolution representation of the previous. The height and width of each image, or level, in the mipmap is typically a factor of two smaller than the previous level. A mipmapped texture has precomputed "levels of detail", where lower levels of detail are created by down sampling the original texture in some meaningful way. Mipmap levels are referred to in descending level of detail, where level 0 is the original texture, and higher-levels are power-of-two reductions of it.

Figure 4:
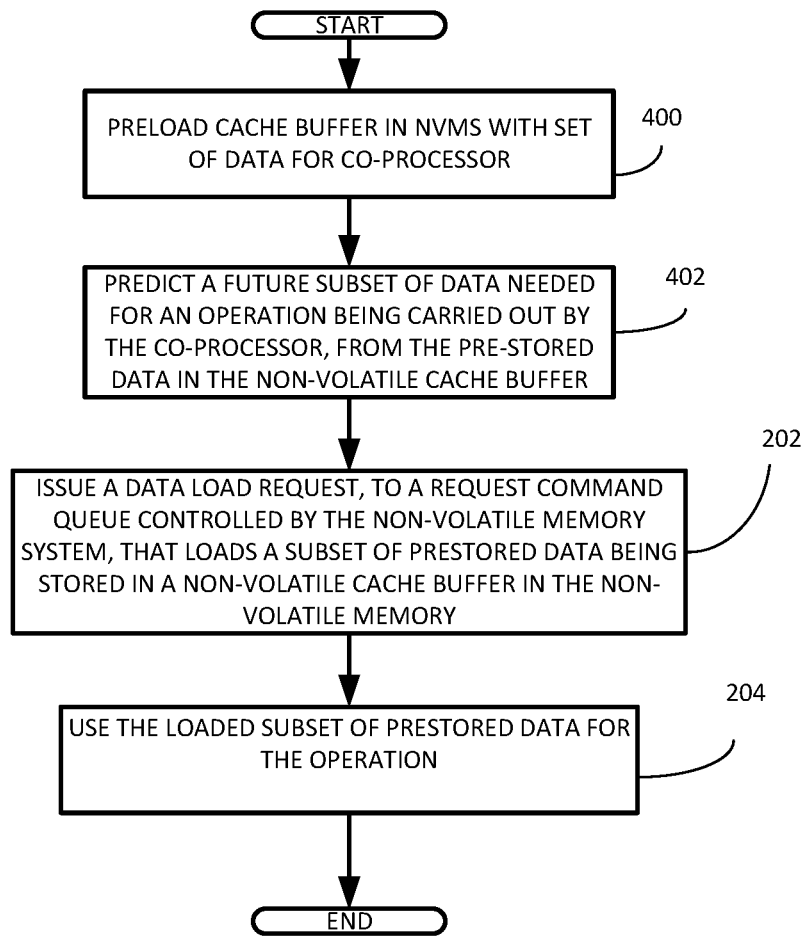
FIG. 4 is a flowchart illustrating a method for direct co-processor access to prestored file system data in a non-volatile memory system in accordance with an example set forth in the disclosure.
Figure 5:
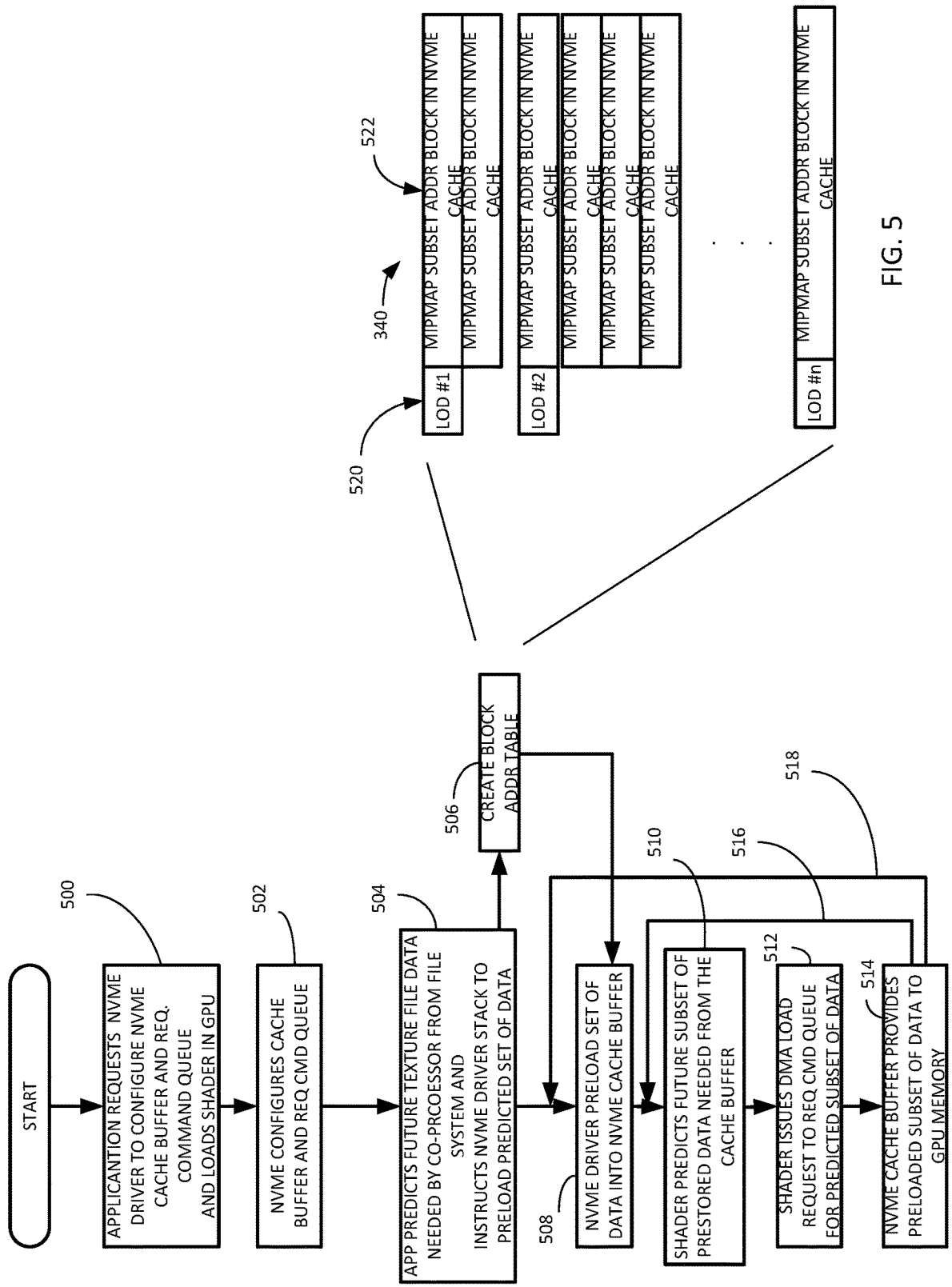
FIG. 5 is a flowchart illustrating a method for direct co-processor access to prestored file system data in a non-volatile memory system in accordance with an example set forth in the disclosure.

Referring also to FIGS. 4 and 5, methods for directly obtaining file system data by the co-processor 106 shown in FIG. 3 will be described. However, any suitable co-processor may be employed. In this example, as shown in block 400 the method includes preloading the cache buffer 116 with the subset of prestored data 118 from a file system 332 associated with an application for the co-processor. In one implementation, this includes the application 302 determining future data from the file system that the co-processor will need. For example, the application 302 determines a mipmap range of texture tiles in the file system 332 that will likely be needed to render scenes. The application 302 sends a preload data request 330, to the NVMe driver 306, executing on the processor 102, indicating a mipmap range (e.g., a group of texture tiles) to preload in the cache buffer 116. In some implementations, the preload data request 330 includes a block address and corresponding data offset in the file system 332 that contains the mipmap range. The NVMe driver 306 preloads the indicated mipmap range as a set of data from the file system 332 into addresses in the cache buffer 116, as shown by line 334 provides the addresses used in the cache buffer 116 to an address block translator 336. The application 302 also provides the mipmap range 338 in the form of LOD to the address block translator 336. The file content may be distributed across several blocks/sectors of the storage device. The address block translator 336 is a table that allows identifying what block contains the data to be read and is precomputed for the GPU so that the GPU simply request the appropriate address in the cache buffer. For example, the NVMe driver 306 provides to the block address translator, the block of address in the cache buffer 116 it used to store each mipmap in the mipmap range. Each mipmap is considered to be a subset of the range of the mipmaps. The address block translator 336 generates a translation table 340 in system memory 104 that identifies the addresses for each separate subset or mipmap in the range of mipmaps that are preloaded.

As shown in block 402 the co-processor 106 predicts a future subset of prestored data needed for an operation being carried out by the co-processor, from the subset of prestored data 118 in the cache buffer 116. For example, the shader 310 identifies a LOD needed to generate a next frame for the application 302. The shader 310 uses the address block translation table 340 to translate a determined level of detail (LOD) to a subset address block 350 in the cache buffer 116 that contains the needed texture that is part of the subset of prestored data 118. For example, when issuing the data load request 120, the data load request 120 includes the translated subset address block 350 information corresponding to the subset of prestored data 124 in the subset of prestored data 118 that corresponds to the determined LOD. For example, the shader 310 issues the data load request 120 for the cache buffer 116 as a direct memory access (DMA) load (read) request 360 for the command queue 114, using the DMA engine 308. In some implementations, to issue the data load request 120, the shader 310 issues the DMA load request by directly issuing a load request to a non-volatile memory (NVMe) storage stack of the non-volatile memory system. For example, the shader 310 issues a DMA load request to the request command queue 114 and the request command queue processor 113 processes the request as shown by arrow 362 to have the requisite loaded data from the cache buffer 116 to the local memory 110. For example, the GPU writes into the dedicated request command queue 114 controlled by the request command queue processor 113 in the non-volatile memory system 112, generating a command-packet containing the parameters of the request. The DMA load operation stores the subset of prestored data 124 from the cache buffer 116 into local memory 110 of the GPU or other GPU cache accessible by the shader 310. The shader 310 then uses the loaded subset of prestored data 126 to render the scene.

In this example the graphics processing unit (GPU) creates pixels including performing shading operations that is carried out by the shader 310. The prestored set of data stored in the cache buffer 116 includes a range of mipmap data wherein subsets of the mipmap data are used depending upon which LOD is needed for a future scene to be generated by the shader 310. The shader 310 identifies a future level of detail (LOD) needed to render an object of an image or scene and issues the load request 120 identifying a block of addresses corresponding to the identified future LOD as the subset of prestored data. The shader 310 performs a pixel rendering operation using the loaded prestored data from the DMA load request. The process of predicting future levels of details is repeated until the application indicates a new scene or group of pictures needs to be created. As such, the GPU, via the shader 310 periodically predicts future subsets of data needed from the prestored set of data in the cache buffer for the scene generation operation, and periodically issues data load requests to the request command queue, corresponding to each of the predicted subsets of data. The shader effectively performs loops of predicting subsets of data to be retrieved from the non-volatile cache and issues DMA requests for each predicted subset of prestored data. If the application determines that a new range of data from a file will be needed, the application asks the NVMe to preload other data from the file into the cache buffer.

As shown in FIG. 5, during an initialization process the host processor 102, namely the processor executing the application, configures the non-volatile memory system 112 using the NVMe driver to configure the request command queue 114 and the cache buffer 116 and determines an amount of data needed from a file system associated with the application 302 to store as the subset of prestored data 118. The host processor 102 preloads the cache buffer 116 with the determined amount of data from the file system associated with an application. For example, as shown in block 500, the application requests the NVMe driver 306 to configure the cache buffer 116 to be a particular cache size to store the subset of prestored data 118 from the file system and to configure the command queue 114 in system memory. This is shown as configuration information 380. The application 302 also loads shader code in the GPU to form the shader 310. As shown in block 502, in response, the NVMe driver 306 configures the request command queue 114 and the cache buffer 116.

As shown in block 504, the method includes the application 302 predicting future data, such as texture data in the form of a mipmap range, that is needed from the file system by the co-processor 106 and instructs the NVMe driver 306 via request 330 to preload the predicted data into the cache buffer 116 (e.g., block addresses and associated data from file system). The address block translator 336 uses the predicted future data, such as the mipmap information, to create and store the address block translation table 340 as shown in block 506. In some implementations the future data is all of the file data that the application will ever use. However, in other implementations, the cache buffer is replenished with data from the file system on an ongoing basis as the application executes. In this example, the address block translation table 340 includes entries that include, for each texture, a LOD number 520 and corresponding block address 522 in the cache buffer 116 where the texture data is stored corresponding to the LOD number. When the shader 310 determines a particular LOD that will be needed for rendering, the shader 310 looks up the LOD number in the block address table and provides the corresponding address in the load request 120 to the command queue 114. Data in blocks can correspond to more than one LOD as shown. Also, the start of data for an LOD can begin in a middle of a block if desired.

As shown in block 508 the NVMe driver 306 preloads (shown by line 334) the file data into the cache buffer 116. As shown in block 510, the GPU shader 310 predicts a future subset of prestored data needed from the prestored set of data in the cache buffer for the operation. As shown in block 512 the shader issues the load request 120 corresponding to the predicted subset of prestored data, to the request command queue 114 controlled by the non-volatile memory system. As shown in block 514, in response to the load request 120, the cache buffer 116 provides the requested subset of prestored data 122 identified in the load request 120 which is stored in the local memory 110 for use by the shader 310. As shown by arrow 516 the process of the shader determining new subsets of data to retrieve from the cache buffer 116 is repeated until for example a new scene change causes the subset of prestored data 118 to not include the level of detail textures needed. For example, loops of DMA requests for subsets of data are made through multiple DMA requests to the cache buffer 116. As such periodic predicted future subsets of data are made as well as periodic issuances of DMA load requests corresponding to those predicted subsets until a new scene or group of pictures has to be generated that do not use the mipmap ranges currently stored in the cache buffer. As shown in by arrow 518, the application can predict future mipmap ranges as scene changes are predicted and the NVMe driver then preloads a new set of file data, such as a new set of mipmap ranges, into the cache buffer 116, such as a cache buffer in the NVMe system or in system memory.

In other words, the application 302 and GPU driver 304 identify the texture tiles that the application will likely need for a particular render scene ahead of time and maintains a list of where the MIP levels required to render the scenes are located on the storage device. The application then asks the GPU driver or shader to preload these texture tiles into the cache buffer which may be located on the NVMe memory system itself or can be located in a dedicated system memory buffer. Out of the set of tiles needed, the GPU shader then determines at execution time which LOD is needed for the particular scene and pulls them in dynamically from the NVMe memory system. This is in contrast to requiring the GPU to send off an interrupt to the kernel driver that then is surfaced to the application and then forwarded to the storage stack by the application, all of which introduces substantial SW overhead at each of these steps for communicating the request.

As disclosed herein a type of on demand texture load is done by using the GPU instead of prior art systems that use a GPU to host based feedback mechanism where the host and application receives a GPU request for file system data. The disclosed system instead decouples the identification of the file content that represents the GPU texture tiles from the actual load request. In other words, the application and GPU driver identifies the texture tiles that the GPU will likely need for a particular render scene ahead of time and the GPU then asks the NVMe driver to preload these texture tiles into the cache buffer, as shown by arrow 382, which may be located in the NVMe system, such as in a DRAM in the NVMe system or can be located in a dedicated system memory buffer. Out of the preloaded set of tiles needed, the GPU shader then determines (e.g., predict) at execution time which LOD is needed for the particular scene and pulls the LOD texture tiles in dynamically from the memory. As the GPU shaders repeatedly render scenes and determine that a new LOD texture tile is needed, a new DMA load request is generated to pull the new LOD texture tile (subset of prestored data) from the set of preloaded LOD texture tiles in the non-volatile memory system. This is in contrast to prior systems that require the GPU to send off an interrupt to the kernel driver that then is surfaced to the application and then forwarded to the storage stack by the application, all of which introduces substantial software overhead at each of these steps for communicating the load request.

Among other technical advantages, the operation described herein can avoid interrupts for transfer completion signaling operations. Also, latency is improved when the GPU, or other type of co-processor, can more directly start processing the transferred file system data from the NVMe system, thereby avoiding the software overhead in communicating the storage stack completion information, which requires: the NVMe driver to fire off an interrupt to the kernel driver, reading the completion queue data, triggering an OS event that then is surfaced to the application and then forwarded to the graphics stack by the application by issuing a DMA request, such as via a Windows Display Driver Model (WDDM) device driver or other suitable driver, that then transitions from user mode to kernel mode before being processed by the GPU. The disclosed system identifies when the data has been put into the target GPU memory with lower latency than what is currently possible via interrupt-based completion signaling. In some implementations, the disclosed operations take advantage of PCIe bus ordering rules to avoid the use of AtomicOperations (AtomicOps) and allows for a relatively simple implementation. For example, for a prior art use case, PCIe AtomicOps are needed, but since the NVMe system in certain implementations is a single-producer component for the completion of a DWORD or QWORD DMA by the NVMe system to system memory, causing a memory location value update that then can be observed by the GPU shader directly, communication overhead is avoided. Instead, the GPU directly identifies when a particular read tile is ready for consumption by the shader engine instead of requiring the application to initiate an explicit render request itself.

Although features and elements are described above in particular combinations, each feature or element can be used alone without the other features and elements or in various combinations with or without other features and elements. The apparatus described herein in some implementations use software or firmware stored on a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). The data stored on the non-transitory computer readable storage medium can then be used (i.e., executed) to create systems (e.g., boards, integrated circuits) that implement various embodiments of the invention.

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. An apparatus comprising:
   a co-processor, operative to provide process operations for a first processor that executes one or more applications, the co-processor operative to:
   issue a data load request to a request command queue, controlled by a non-volatile memory system, that loads a subset of prestored data from a prestored set of data being stored in a cache buffer, for an operation performed by the co-processor based on periodically predicting future blocks of addresses corresponding to subsets of data needed from the prestored set of data in the cache buffer for the operation; and
   use the loaded subset of prestored data for the operation.

2. The apparatus of claim 1 wherein the co-processor is operative to issue the data load request as a direct memory access (DMA) load request for the cache buffer and wherein the operation is carried out for an application and wherein the prestored set of data comprises a prestored set of data from a file system associated with the application.

3. The apparatus of claim 2 wherein the co-processor is operative to:
   periodically issues a DMA load request to the request command queue controlled by the non-volatile memory system, corresponding to each of the predicted future blocks of addresses corresponding to the subsets of data from the prestored set of data.

4. The apparatus of claim 1 wherein the co-processor is operative to use an address block translation table to translate a determined level of detail (LOD) to at least one texture prestored in the prestored set of data, and wherein the data load request includes translated block address information corresponding to the subset of prestored data in the prestored set of data that corresponds to the determined LOD.

5. The apparatus of claim 2 wherein the co-processor comprises a graphics processing unit (GPU) and wherein the prestored set of data being stored in the cache buffer comprises a range of mipmap data and wherein the GPU is operative to:
   identify a future level of detail (LOD) needed to render an object of an image and issues the DMA load request identifying a block of addresses corresponding to the identified future LOD as the subset of prestored data; and
   perform a pixel rendering operation using loaded subset of prestored data from the DMA load request.

6. The apparatus of claim 2 wherein the co-processor is operative to issue the DMA load request by issuing a load request for the non-volatile memory system based on an address block translation table.

7. A computer processing system comprising:
   a processor operative to execute one or more applications;
   a non-volatile memory system, operatively coupled to the processor, comprising a request command queue and a cache buffer; and
   a co-processor, operatively coupled to the processor and to the non-volatile memory system, and operative to provide operations for the processor, the co-processor operative to:
   issue a data load request to the request command queue controlled by the non-volatile memory system, that loads a subset of prestored data from a prestored set of data being stored in the cache buffer in the non-volatile memory system, for an operation performed by the co-processor based on periodically predicting future blocks of addresses corresponding to subsets of data needed from the prestored set of data in the cache buffer for the operation; and
   use the loaded subset of prestored data for the operation.

8. The computer processing system of claim 7 wherein the processor is operative to configure system memory to include the request command queue and configure the non-volatile memory system to include the cache buffer and is operative to determine an amount of data from a file system to store as the prestored set of data.

9. The computer processing system of claim 7 wherein the processor is operative to preload the cache buffer with a prestored set of data from a file system associated with an application.

10. The computer processing system of claim 7 wherein the co-processor issues the data load request as a direct memory access (DMA) load request for the cache buffer and wherein the operation is carried out for an application and wherein the prestored set of data comprises a prestored set of data of mipmaps from a file system associated with the application.

11. The computer processing system of claim 10 wherein the co-processor is operative to:
    periodically issue data load requests to the request command queue, corresponding to each of the predicted subsets of data.

12. The computer processing system of claim 7 wherein the co-processor is operative to use an address block translation table to translate a determined level of detail (LOD) to at least one texture prestored in the prestored set of data, and wherein the data load request includes translated block address information corresponding to the subset of prestored data in the prestored set of data that corresponds to the determined LOD.

13. The computer processing system of claim 12 wherein the co-processor is operative to periodically issue the data load requests that each includes block address information corresponding to each of the subsets of data in the prestored set of data.

14. The computer processing system of claim 10 wherein the co-processor comprises a graphics processing unit (GPU) and wherein the prestored set of data being stored in the cache buffer comprises a range of mipmap data and wherein the GPU is operative to:
   identify a future level of detail (LOD) needed to render an object of an image and issue the DMA load request identifying a block of addresses corresponding to a subset of mipmap data for the future LOD; and
   perform a pixel rendering operation using loaded subset of prestored data from the DMA load request using the subset of mipmap data.

15. The computer processing system of claim 10 wherein the co-processor is operative to issue the DMA load request by issuing a load request for the non-volatile memory system.

16. A method carried out by a co-processor that performs operations for a first processor, the method comprising:
   issuing a data load request to a request command queue controlled by a non-volatile memory system, that loads a subset of prestored data from a prestored set of data being stored in a cache buffer, for an operation performed by the co-processor based on periodically predicting future blocks of addresses corresponding to subsets of data needed from the prestored set of data in the cache buffer for the operation; and
   using the loaded subset of prestored data for the operation.

17. The method of claim 16 comprising:
   periodically issuing data load requests to the request command queue controlled by the non-volatile memory system, corresponding to each of the predicted subsets of data.

18. The method of claim 16 comprising issuing the data load request as a direct memory access (DMA) load request for the cache buffer by issuing a load request for the non-volatile memory system and wherein the operation is carried out for an application and wherein the prestored set of data comprises a prestored set of data from a file system associated with the application.

19. The method of claim 16 comprising using an address block translation table to translate a determined level of detail (LOD) to at least one texture prestored as the prestored set of data, and wherein the data load request includes translated block address information corresponding to the subset of prestored data in the prestored set of data that corresponds to the determined LOD.

20. The method of claim 18 comprising:
   identifying a future level of detail (LOD) needed to render an object of an image and issues the DMA load request identifying a block of addresses corresponding to the identified future LOD as the subset of prestored data; and
   performing a pixel rendering operation using loaded subset of prestored data from the DMA load request.

* * * * *